United States Patent [19]

Chauvel et al.

[11] Patent Number: 5,753,728
[45] Date of Patent: May 19, 1998

[54] POLYMER COMPOSITIONS COMPRISING ELECTROACTIVE AMPHIPHILIC ORGANIC COMPOUNDS AND ELECTROCONDUCTIVE SHAPED ARTICLES PRODUCED THEREFROM

[75] Inventors: Bernard Chauvel, Eubonne; Joel Richard, Chantilly, both of France

[73] Assignee: Rhone-Poulenc Chimie, Courbevoie Cedex, France

[21] Appl. No.: 465,308

[22] Filed: Jun. 5, 1995

Related U.S. Application Data

[62] Division of Ser. No. 132,966, Oct. 7, 1993, abandoned.

[30] Foreign Application Priority Data

Oct. 7, 1992 [FR] France ............... 92 12265

[51] Int. Cl.$^6$ ........................ C08K 5/45
[52] U.S. Cl. .............. 524/84; 524/82; 524/83; 524/99; 524/108; 524/109; 524/531; 524/532; 524/535
[58] Field of Search ............... 524/82, 83, 84, 524/108, 109, 531, 532, 535, 99

[56] References Cited

U.S. PATENT DOCUMENTS

| | | | |
|---|---|---|---|
| 3,424,698 | 1/1969 | Lupinski et al. | 252/500 |
| 3,936,307 | 2/1976 | Asakawa et al. | 96/90 R |
| 4,183,006 | 1/1980 | Murakami et al. | 428/419 X |
| 4,349,606 | 9/1982 | Kishimoto et al. | 428/411 |
| 4,359,411 | 11/1982 | Kim et al. | 252/500 |
| 4,684,598 | 8/1987 | Potember et al. | 252/500 X |
| 4,769,177 | 9/1988 | Hocker et al. | 252/500 |
| 4,900,842 | 2/1990 | Robin et al. | 549/36 |
| 4,939,556 | 7/1990 | Eguchi et al. | 357/4 |
| 4,952,622 | 8/1990 | Chauvel et al. | 524/376 |
| 5,006,278 | 4/1991 | Elsenbaumer | 427/385.5 |
| 5,086,092 | 2/1992 | Schupp et al. | 524/83 X |
| 5,324,791 | 6/1994 | Finter et al. | 525/330.1 |
| 5,356,744 | 10/1994 | Yanus | 430/62 |
| 5,378,744 | 1/1995 | Chetcuti | 524/84 |
| 5,387,627 | 2/1995 | Nilei | 524/84 |

FOREIGN PATENT DOCUMENTS

| | | |
|---|---|---|
| 0 069 292 | 1/1983 | European Pat. Off. |
| 0 217 987 | 4/1987 | European Pat. Off. |
| 0 281 449 | 9/1988 | European Pat. Off. |
| 0 285 564 | 10/1988 | European Pat. Off. |
| 0 362 142 | 4/1990 | European Pat. Off. |
| 2 027 704 | 10/1970 | France. |
| 4 037 799 | 6/1992 | Germany. |
| 0126850 | 8/1982 | Japan .................. 524/82 |
| 0126852 | 8/1982 | Japan .................. 524/82 |
| 0126853 | 8/1982 | Japan .................. 524/82 |
| 0180657 | 11/1982 | Japan .................. 524/84 |
| 0014411 | 1/1983 | Japan .................. 524/82 |

OTHER PUBLICATIONS

Vandevyver et al, "Behavior Of Bis(alkylthio)tetrathiafulvalene Derivatives Of Langmuie–Blodgett Films Upon Iodine Exposure", *J. Phys. Chem.*, 95(1), pp. 246–251, 1991.

IBM Technical Bulletin, vol. 20, No. 7, Dec. 1977, N.Y. pp. 2865–2867.

Polymer Journal, vol. 24, No. 3, Mar. 1992, Tokyo, pp. 273–279.

Chemical Abstracts, vol. 104, 1986, Columbis, Ohio, Abstract No. 225469a, Inasawa, Shintaro "Conductive Polymers", p. 18, col. 1; & JP A 61 002 703 (Showa Denko K.K.) Jan. 1986.

*Primary Examiner*—Judy M. Reddick
*Attorney, Agent, or Firm*—Burns, Doane, Swecker & Mathis, L.L.P.

[57] ABSTRACT

Polymeric compositions well suited for conversion into electroconductive shaped articles, e.g., films, comprise at least one convertible polymer (Pm) and at least one amphiphilic organic compound (B) which comprises a charge transfer complex or a radical ion salt having the formula (I): $D_dA_aZ_z$, in which D is an electron donor; A is an electron acceptor; Z is a doping agent which itself can be a non-amphiphilic electron donor or electron acceptor, with the proviso that at least one of D and A is amphiphilic and contains at least one saturated or unsaturated hydrocarbon substituent having at least 10 carbon atoms; d is a number equal to or greater than 0; a is a number equal to or greater than 0; and z is a number equal to or greater than 0, with the further proviso that at least one of the symbols d and a is a number greater than 0.

3 Claims, No Drawings

POLYMER COMPOSITIONS COMPRISING ELECTROACTIVE AMPHIPHILIC ORGANIC COMPOUNDS AND ELECTROCONDUCTIVE SHAPED ARTICLES PRODUCED THEREFROM

This application is a divisional, of application Ser. No. 08/132,966, filed Oct. 7, 1993, now abandoned.

BACKGROUND OF THE INVENTION

1. Field of the Invention

The present invention relates to novel polymer compositions comprising electroactive amphiphilic organic compounds of the charge transfer complex and/or radical ion salt family, and, more especially, to polymer particles having, implanted or embedded, or entangled into the face surface area thereof, molecules of said amphiphilic compounds, to a process for the production of such particulates and the conversion thereof into conductive polymer films.

2. Description of the Prior Art

It is known to this art to produce conductive polymers comprising polymer chains of conjugated double bonds via anodic polymerization in the presence of conductive salts, or via chemical polymerization under the action of oxidizing agents, of heterocyclic compounds containing two conjugated double bonds, such as pyrrole, thiophene or furan and substituted derivatives thereof. In spite of their interest, the industrial development of these polymers has been retarded by various disadvantages such as relative chemical instability, weak mechanical properties and, especially, application difficulties inherent in their low solubility. Even the more stable polymers, such as polypyrroles, are only difficultly applied on an industrial scale. Various solutions have been proposed to the problem of effective use of this type of conductive polymer. Thus, it has been proposed (cf. R. Yosomiya et al, *Makromol. Chem. Rapid. Comm.*, 7, 697–701 (1986)) to prepare composite electroconductive films by contacting pyrrole vapors with a preformed film of a film-forming polymer (poly(vinyl alcohol), poly(vinyl chloride), poly(methyl methacrylate)) containing an oxidizing agent (for example $CuCl_2$).

Also, European Patent Application No. 0,206,414, and U.S. Pat. No. 4,521,450 describe chemically polymerizing pyrrole in the liquid phase in a porous or absorbing solid such as paper or cellulosic materials, natural or synthetic fibers, or thin plastic films (polyethylene or polypropylene, for example).

Lastly, the anodic or chemical polymerization of monomers containing conjugated double bonds too has been described, especially of pyrrole and substituted derivatives thereof, in the presence of convertible polymer particles comprising ionic functional groups, which serve as a doping agent or dopant, of the uncharged polymer by providing the counterion necessary to balance the electrical charges of the conductive polymer; cf. British Patent Application No. 2,124,635, U.S. Pat. No. 4,552,927, European Patent Applications Nos. 0,160,207 and 0,229,992, French Patent Application No. 2,616,790, S. J. Jasne et al, *Synthetic Metals*, 15, 175–182 (1986). In this type of process, the doping polymer is generally dispersed in the polymerization medium and, more particularly, the polymerization is carried out in a doping polymer latex. Such a process is indicated to be particularly advantageous because it provides for the production of polymer particles comprising the doping convertible polymer in combination with the electroconductive polymer. Depending on the particular case, the dispersions of these particles can be directly used to produce electroconductive articles by coating and evaporation of the dispersion medium, or else the composite electroconductive particles can be separated from the dispersion medium by conventional techniques and converted into finished articles.

European Patent EP-A-0,362,141 describes preparing an electroconductive polymer comprising a polymeric substrate, on the surface of which is deposited a network containing needles of a charge transfer complex. This polymer is only conductive at the surface and the process requires two stages: the first for preparing the polymeric substrate and the second for depositing the charge transfer complex.

SUMMARY OF THE INVENTION

Accordingly, a major object of the present invention is the provision of polymers which are electroconductive throughout the entire volume thereof.

Thus, one object of the present invention is polymer compositions useful for producing easily convertible conductive polymers.

A second object of this invention is the provision of partial aqueous or aqueous/organic dispersions of polymer compositions useful for producing easily convertible electroconductive polymer compositions.

A third object of the invention is the provision of a process for preparing polymer compositions useful for producing conductive polymer compositions.

A fourth object of the present invention is the provision of conductive polymer compositions, per se.

A fifth object of this invention is the provision of aqueous or aqueous/organic dispersions of said conductive polymer compositions.

And a sixth object of the present invention is the conversion of such electroconductive polymer compositions into conductive coatings.

Briefly, the present invention features polymeric compositions comprising at least one convertible polymer (Pm) and at least one amphiphilic organic compound (B) selected from among charge transfer complexes and radical ion salts of general formula (I):

$$D_dA_aZ_z \quad (I)$$

in which D is an electron donor; A is an electron acceptor; Z is a doping agent which itself can be a non-amphiphilic electron donor or electron acceptor, with the proviso that at least one of the species D and A is amphiphilic and which comprises at least one saturated or unsaturated hydrocarbyl substituent having at least 10 carbon atoms; d is a number equal to or greater than 0; a is a number equal to or greater than 0; z is a number equal to or greater than 0; and at least one of the symbols d and a is a number greater than 0.

DETAILED DESCRIPTION OF PREFERRED EMBODIMENTS OF THE INVENTION

More particularly according to the present invention, the symbols d, a and z generally represent independently of each other, numbers which can range up to 20.

Exemplary electron donors D include:

(1) Tetraheterofulvalenes and derivatives thereof of general formula (II):

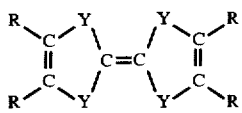

(II)

in which Y is S or Se and R is a saturated or unsaturated, aliphatic, cycloaliphatic or aromatic hydrocarbon radical;

(2) Tetraheterotetracenes and derivatives thereof of general formula (III):

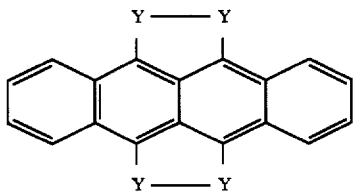

(III)

in which Y is S and/or Se;

(3) Tetraheteronaphthalenes and derivatives thereof of general formula (IV):

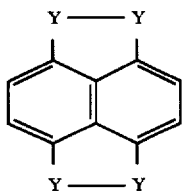

(IV)

in which Y is S and/or Se;

(4) Perylene and derivatives thereof;

(5) Bisheteropyrans and derivatives thereof of general formula (V):

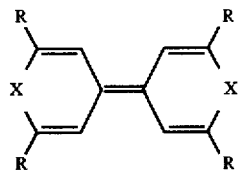

(V)

in which X is S and/or Se or an N-alkyl radical and R is a saturated or unsaturated, aliphatic, cycloaliphatic or aromatic hydrocarbon radical;

(6) Aliphatic bases such as quaternary ammonium groups containing 4 saturated or unsaturated hydrocarbon radicals, at least one of which has at least 10 carbon atoms;

(7) Aromatic bases such as quaternary ammonium groups deriving from aniline or from aniline derivatives, in which the substituent on the nitrogen atom or, if appropriate, at least one substituent on the benzene ring(s), is a saturated or unsaturated hydrocarbon radical having at least 10 carbon atoms, from N,N'-tetramethylphenylenediamine and from derivatives thereof;

(8) Heterocyclic bases such as quaternary ammonium groups deriving from pyridines, piperidines, bipyridines, bipiperidines, benzopyridines such as quinolines, isoquinolines, acridines, phenazines and phenanthrolines, in which the substituent on the nitrogen atom or, if appropriate, at least one substituent on the heterocycle(s) and benzene ring(s), is a saturated or unsaturated hydrocarbon radical having at least 10 carbon atoms;

(9) Heterocyclic bases containing several heteroatoms of different natures, such as sulfur and nitrogen atoms, such as N-alkylbenzothiazoles and their substituted derivatives and N-alkylindoleninium trimethincyanines and their substituted derivatives.

Particularly exemplary electron acceptors A are tetracyanoethylene (TCNE), hexacyanobutadiene (HCBD), 1,2,4,5-tetracyanobenzene (TCNB), 7,7,8,8-tetracyanoquinodimethane (TCNQ) and substituted derivatives thereof, tetracyanodiquinodimethane (TCNDQ), enzotetracyanoquinodimethane (benzo-TCNQ), 2,3,5,6-tetrachloro-parabenzoquinone (CA), trinitrobenzene (TNB), tetranaphthoquinodimethane (TNAP), thiophenetetracyanoquinodimethane (thiophene-TCNQ), selenophenetetracyanoquinodimethane (selenophene-TCNQ) or tetracyanoquinoquinazolinoquinazoline, as well as the derivatives of such electron acceptors, such as their halogenated, more particularly fluorinated, derivatives, their alkoxylated derivatives and their alkylated derivatives.

The doping moiety Z can be a Lewis acid such as $I^-$, $(I_3)^-$, $(PF_6)^-$, $(ClO_4)^-$, $(BF_4)^-$, $(ReO_4)^-$, $(IO_4)^-$, $(FSO_3)^-$, $(AsF_4)^-$, $(AsF_6)^-$, $Br^-$, $Cl^-$ and $(MnCl_6)^-$.

Preferably, Z is $I^-$, $(I_3)^-$ or $Cl^-$.

The amphiphilic compound (B) in the polymeric compositions of the invention preferably comprises an amphiphilic donor compound of general formula (VI):

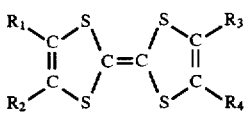

(VI)

in which $R_1$ and $R_2$, which may be identical or different, are each a saturated or unsaturated, aliphatic, cycloaliphatic or aromatic hydrocarbon radical, at least one of which is a hydrophobic species; and $R_3$ and $R_4$, which may be identical or different, are each a hydrophilic radical.

The radicals $R_1$ and $R_2$ are advantageously linear or branched alkyl or alkylthio radicals having from 1 to 30 carbon atoms, substituted or unsubstituted cycloalkyl, substituted or unsubstituted cycloalkylthio, substituted or unsubstituted cycloalkylalkyl or substituted or unsubstituted cycloalkylalkylthio radicals, the cyclic moiety of which is preferably a cyclohexyl or cyclopentyl radical, the alkyl substituent(s) have from 1 to 30 carbon atoms and the alkyl backbone has from 1 to 30 carbon atoms, and aryl or arylthio radicals such as phenyl, phenylthio or naphthyl, alkylaryl or alkylarylthio radicals in which the alkyl substituent(s) have from 1 to 30 carbon atoms and the aryl moiety is a phenyl or naphthyl radical, and aralkyl or aralkylthio radicals in which the alkyl moiety has from 1 to 30 carbon atoms and the aryl moiety is a phenyl or naphthyl radical, with the proviso that at least one of the groups $R_1$ and $R_2$ is hydrophobic, namely, comprising a linear or branched alkyl or alkylthio radical having from 10 to 30 carbon atoms, or an alkylaryl, alkylarylthio, aralkyl or aralkylthio radical in which the alkyl group(s) have 6 to 30 carbon atoms, or an alkylcycloalkyl, alkylcycloalkylthio, cycloalkylalkyl or cycloalkylthio radical in which the alkyl group(s) have 6 to 30 carbon atoms. $R_1$ and $R_2$ are, preferably, both hydrophobic groups.

The radicals $R_3$ and $R_4$ are advantageously a hydroxycarbonyl group, alkali metal, amine or quaternary ammonium salt of a hydroxycarbonyl group, hydroxycarbonylalkyl or hydroxycarbonylalkylthio group having 2 to 7 carbon atoms, alkoxycarbonyl, alkoxycarbonylalkyl or alkoxycarbonylalkylthio group having from 2 to 8 carbon atoms, the carbamoyl group, or carbamoylalkyl or N-alkylcarbamoylalkyl group having from 2 to 12 carbon atoms.

Preferred radicals $R_1$ and $R_2$ comprise a linear and/or cyclic hydrocarbon chain having from 14 to 30 carbon atoms; exemplary thereof are tetradecyl, tetradecylthio, hexadecyl, hexadecylthio, octadecyl, octadecylthio, icosyl, icosylthio, nonylphenyl, octylphenyl, dinonylphenyl and dioctylphenyl radicals.

The preferred radicals $R_3$ and $R_4$ are the hydroxycarbonyl radical, alkali metal, amine or quaternary ammonium salts of the hydroxycarbonyl radical, hydroxycarbonylalkyl and hydroxycarbonylalkylthio radicals having from 2 to 4 carbon atoms such as, for example, hydroxycarbonylmethyl, hydroxycarbonylmethylthio, hydroxycarbonylethyl, hydroxycarbonylethylthio, hydroxycarbonylpropyl or hydrocarbonylpropylthio radicals, and alkoxycarbonyl, alkoxycarbonylalkyl and alkoxycarbonylalkylthio radicals having from 2 to 5 carbon atoms such as, for example, methoxycarbonyl, ethoxycarbonyl, methoxycarbonylmethyl, methoxycarbonylmethylthio, methoxycarbonylethyl, methoxycarbonylethylthio, methoxycarbonylpropyl, methoxycarbonylpropylthio, ethoxycarbonylethyl or ethoxycarbonylethylthio radicals.

The amphiphilic organic compounds of general formula (VI) are preferably combined with a doping agent Z as defined above.

Mixtures of a plurality of amphiphilic compounds $D_dA_aZ_z$, of course, can also be used.

The conditions necessary for conduction in the amphiphilic compounds are the following:

(a) existence of segregated stacks of acceptors or of donors: bichain structures for the charge transfer complexes (CTC) and monochains for the radical ion salts (RIS);

(b) a fractional charge transfer (or ionicity) level expressing a mixed valency state: partial charge transfer between A and D in the CTCs and incomplete reduction or oxidation of A or D in the RISs;

(c) overlap of the $\pi$ orbitals which makes possible electron delocalization along the stacks.

These stacks (or blocks), formed by molecules of the same nature, can be of a number of types, depending on the nature of A or D or of the counterion; two extreme examples of which are:

(i) regular stacking along an axis of centrosymmetrical dimers;

(ii) orthogonal dimers in a plane forming a virtually two-dimensional paving.

The amphiphilic organic compound (B) can be prepared via conventional processes, such as that described by L. R. Melby et al, *Journal of the American Chemical Society*, Vol. 84, pages 3374–3387 (1962).

The amphiphilic organic compounds (B) of formula $D_dA_a$, i.e, devoid of the doping agent Z, are prepared by reacting a halide of the electron donor D with a salt of the electron acceptor A, for example an iodide of D with a lithium salt of A. It is also possible to react the compound thus obtained with an excess of the electron acceptor A, which generally makes it possible to prepare an amphiphilic organic compound which conducts electricity. The amphiphilic organic compounds of formula $D_dA_aZ_z$ can be prepared by reacting a compound of D and of Z with the electron acceptor A.

The starting compounds for the preparation of the amphiphilic organic compounds are obtained via conventional processes. Likewise, the electron acceptors A are known compounds which are prepared according to conventional processes.

As polymer constituting the convertible particles, which can be used as constituent (Pm) of the compositions according to the invention, any polymer which can be used is easily converted into finished shaped articles, such as fibers, films, molded objects or coatings, by conventional techniques for the conversion of polymers, such as extrusion, extrusion/blowing, calendering, molding, coating, and the like. Therefore, a wide variety of thermoplastic polymers can thus be used, such as polymers and copolymers of α-olefins (polyethylene, polypropylene, ethylenepropylene copolymers), polymers and copolymers of conjugated diolefins (polybutadiene, polyisoprene, butadiene/isoprene copolymers); polymers and copolymers of styrene and of α-methylstyrene with other mono- or polyethylenic monomers, such as polystyrene, styrene/butadiene or styrene/acrylonitrile copolymers, styrene/butadiene/acrylonitrile copolymers, styrene/butadiene/unsaturated carboxylic acid copolymers, such as, for example, styrene/butadiene/maleic acid copolymers, polymers and copolymers of vinyl esters: vinyl acetate or vinyl propionate, such as poly(vinyl acetate), ethylene/vinyl acetate copolymers and their derivatives of hydrolysis (ethylene/vinyl alcohol copolymers, ethylene/vinyl acetate/vinyl alcohol copolymer), acrylic copolymers: polyacrylonitrile, poly (alkyl acrylates) and poly(alkyl methacrylates), polyacrylamides, polymethacrylamides, poly(N-methylolacrylamide), or poly(N-methoxymethacrylamide), polymers and copolymers of ethylenic dicarboxylic acids or anhydrides or their esters, such as fumaric, maleic or itaconic acids, polymers and copolymers of ethylenic halides, such as poly(vinyl chloride), poly(vinylidene chloride), poly (vinylidene fluoride), and the like.

Thermoplastic polymers are preferred which are easily dispersible in water in the form of stable aqueous dispersions or of latexes.

Thermoplastic polymers, such as those indicated above, can also be used, containing, along their backbones, units bearing anionic groups which can serve as a doping agent for initiating the conduction phenomenon. More particularly, polymers derived from ethylenic monomers containing sulfonic acid or alkali metal, alkaline earth metal or ammonium sulfonate groups, such as vinylsulfonates, methallylsulfonates, vinylbenzenesulfonates, salts of 2-acrylamido-2-methylpropanesulfonic acid, or 2-sulfoethyl acrylate, or polymers derived from ethylenic monomers containing phosphate groups, such as a bis(2-chloroethyl) vinylphosphonates, can thus be used.

Polymers containing anionic groups which are very particularly well suited for the preparation of the polymer compositions according to the invention include copolyesters containing a plurality of structural units derived from diols and/or from diacids containing one or a plurality of sulfonic acid or sulfonate groups. Such copolyesters are described, especially, in French Patents Nos. 1,401,581 and 1,602,002, and in European Patent No. 0,129,674. Grafted copolymers can also be used, obtained by aqueous phase radical polymerization of one or a plurality of acrylic monomer(s) optionally combined with one or more vinyl monomer(s), in the presence of a copolyester containing a plurality of structural units derived from diols and/or from diacids containing one or a plurality of sulfonic acid or sulfonate groups, such as those described in the above-mentioned patents or patent applications. Such grafted copolymers have been described in European Patent Application No. 0,260,203, hereby expressly incorporated by reference.

The polymer compositions according to the invention can be prepared by any process permitting incorporating the amphiphilic compound (B) in the polymer (Pm). A process which is particularly well suited for producing these compositions entails adding the amphiphilic compound (B) to an aqueous or aqueous/organic dispersion of convertible polymer particles (Pm). In this manner, polymer particles (Pm) —are provided which contain, implanted at their face surface area, molecules of the amphiphilic compound (B). The hydrophobic chains of the compound (B) are intimately entangled with the chains of the polymer (Pm) comprising such particles and the hydrophilic and electroactive moieties of the compound (B) are arranged at the face surfaces of said particles.

Consequently, the convertible polymers (Pm) described above are preferably used in the form of stable dispersions, or of latexes, in water or an aqueous/organic medium. When the polymer does not contain a hydrophilic group permitting ready preparation of a latex, it can be combined with one or more ionic or nonionic surface-active agents, such as those commonly used for producing aqueous dispersions and well known to this art. To produce particles according to the invention, the polymer content of the latexes is not critical and can vary over wide limits. Generally, latexes containing from 1% to 50% by weight of polymer are well suited; preferably, latexes are used containing from 5% to 30% by weight of polymer. The size of the particles of the polymer constituting the latex is selected according to the intended application of the final latex; in general, latexes are used in which the diameter of the polymer particles ranges from approximately 0.01 to 15 μm. and preferably from 0.05 and 5 μm.

Particles of polymers modified by the amphiphilic organic compounds of formula (I) can be prepared by addition, with stirring, of a solution of the amphiphilic compound (B) in an organic solvent to an aqueous or aqueous/organic dispersion of the polymer substrate (Pm). The nature of the solvent is not critical and initially depends on the nature of the amphiphilic compound, on that of the polymer substrate and on the medium containing same. Solutions of the amphiphilic compound in an organic solvent are preferably used. Thus, when the amphiphilic compound is a derivative of tetrathiafulvalene (TTF), a hydrocarbon or a chlorinated hydrocarbon can be used, such as toluene, chloroform or dichloromethane; it is also possible to use a water-miscible solvent such as acetone or methyl ethyl ketone,, or also mixtures of solvents, such as chloroform/acetonitrile.

When the addition is complete, the solvent of the amphiphilic compound is removed by evaporation. To provide homogeneous mixing of the amphiphilic compound with the polymer substrate, the mixture can be heated at a temperature which depends on the nature of the polymer. Generally, it proves advantageous to carry out the addition of the amphiphilic compound at a temperature in the region of the glass transition temperature of the polymer (Pm). When the solvent of the amphiphilic compound exerts a swelling action on the polymer substrate, such heating is not necessary.

The respective amounts of polymer (Pm) and of amphiphilic compound (B) present in the compositions according to the invention can vary over wide limits. Thus, the amount of compound (B) can constitute from 0.1% to 20% by weight of the polymer (Pm), and preferably from 0.2% to 5%.

The polymer substrate (Pm) and amphiphilic compound (B) compositions can be separated from the latex by known methods, for example by centrifuging.

They can also be employed in latex form or in the form of dispersions, especially aqueous dispersions.

The polymer (Pm) and amphiphilic compound (B) compositions are very particularly well suited for providing conductive polymers which are easily converted into a wide variety of shaped articles, such as films, yarns, coatings, or molded objects. The present invention thus also features such conductive polymers and the processes for their production.

These dispersions, and especially the aqueous dispersions, can be used for producing thermoplastic films bearing a coating of electroconductive polymer on at least one of the face surfaces thereof. Exemplary thermoplastic films include those films made of polyethylene, polypropylene, polyamides (polyamides-66 or polyamide-6, for example), poly(vinyl chloride), poly(vinylidene chloride), cellulose derivatives, polyester and, especially, poly(alkylene glycol terephthalate).

The polymer dispersions according to the invention can then be deposited onto the thermoplastic films by known coating techniques. In the event that the film is obtained by drawing or multi-axial drawing of an amorphous extruded film, coating can be carried out before any drawing or, if appropriate, between two successive drawings (in-line coating), or after production of the drawn film (out-of-line coating). Prior to coating with the electroconductive polymer, the thermoplastic film can be subjected to a treatment to improve the adhesion of it to the electroconductive coating (for example, corona treatment), or can receive a primary adhesion coating of known type.

Thus, the present invention also features thermoplastic films bearing such electroconductive polymer coating.

The convertible polymeric compositions comprising at least one convertible polymer (Pm) and one amphiphilic compound (B) can be rendered electroconductive by precursors of the doping agent Z, such as, for example, iodine, bromine or chlorine.

Such doping is carried out either on the polymeric composition as is, or, preferably, on the shaped polymeric composition, especially in the form of a coating of a thermoplastic polymer film as described above.

In order to further illustrate the present invention and the advantages thereof, the following specific examples are given, it being understood that same are intended only as illustrative and in nowise limitative.

EXAMPLE 1

Synthesis of Dioctadecylthiobis
(Methoxycarbonylmethylthio)Tetrathiofulvalene
(C18-TTF):

This synthesis was carried out in four stages.
(1) Synthesis of the organozinc compound (a):

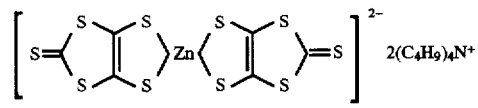

23 g of sodium were added to 200 ml of carbon disulfide ($CS_2$) in a 1-liter reactor under a dry nitrogen atmosphere. The mixture was heated to reflux at 40° C. and 200 ml of dimethylformamide (DMF) were added dropwise over 30 minutes. The mixture was maintained for 2 h at reflux. 200 ml of $CS_2$ and 200 ml of DMF were then added and the mixture was heated to reflux for an additional 2 h. The solution was then evaporated at 45° C. under reduced pressure. The residue obtained was redissolved in a mixture containing 600 ml of methanol and 300 ml of water. There were then successively added:

(i) 20 g of $ZnCl_2$ in 500 ml of aqueous ammonia and 500 ml of methanol;

(ii) 80 g of tetra-n-butylammonium bromide in 250 ml of water.

A violet precipitate was obtained in a dark red solution, which was permitted to stand. The precipitate was then filtered, washed with isopropanol and with ether, and dried. There were thus obtained 114 g of the organozinc compound (a) which was recrystallized from an acetone/isopropanol mixture. The yield of the reaction was 97%.

(2) Synthesis of the thiones (b1) and (b2) from compound (a):

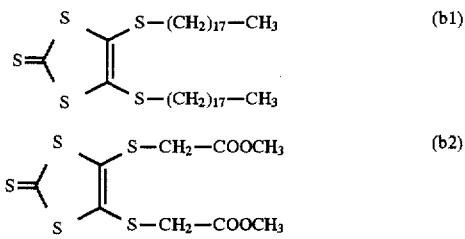

10 millimoles (mmol) of compound (a) were mixed with 40 mmol of 1-bromooctadecane in 400 ml of acetone. The mixture was heated to reflux. After cooling, a yellow precipitate was obtained which was recrystallized from acetone. It was confirmed by IR spectroscopy that the thione compound (b1) had been obtained: band at 1,060 cm$^{-1}$. The yield of the reaction was approximately 50%.

The synthesis of (b2) was carried out in the same manner, but replacing 1-bromooctadecane with methyl bromoacetate. After cooling, an ochre compound was obtained which was recrystallized from ethanol. It was confirmed by IR spectroscopy that the thione ester compound (b2) had been obtained: bands at 1,060 cm$^{-1}$ and at 1,725 cm$^{-1}$. The yield of the reaction was approximately 60%.

(3) Synthesis of the ketones (c1) and (c2) from thiones (b1) and (b2):

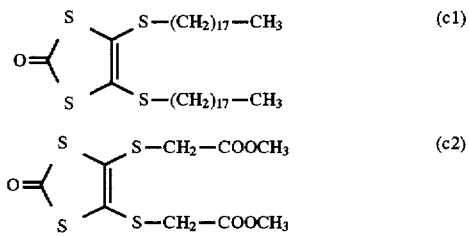

The synthesis of the above two ketones was carried out in the same manner. 10.46 g of mercuric acetate contained in 300 ml of acetic acid were added dropwise to 4.78 g of compound (b1) or (b2) contained in 400 ml of chloroform cooled using an ice bath. A white precipitate was obtained. After stirring at room temperature for 2 h, the precipitate was filtered and washed copiously. The two ketones (c1) and (c2) were purified by chromatography on a silica column. It was confirmed by IR spectroscopy that the products obtained show the bands characteristic of the expected ketones: at 1,670–1,675 cm$^{-1}$ for (c1) and at 1,670–1,675 cm$^{-1}$ and at 1,725 cm$^{-1}$ for (c2).

(4) Synthesis of C18-TTF:

3.7 g of ketone (c1) were mixed with 1.7 g of ketone (c2) in 100 ml of pure triethyl phosphite (distilled under nitrogen) and the mixture was heated at reflux for 1 h. After cooling, 2 g of orange precipitate were obtained. The C18-TTF was separated by chromatography. The yield was 20%.

EXAMPLE 2

(a) Preparation of a latex of styrene/butadiene copolymer particles containing dioctadecylthiobis (methozycarbonvlmethylthio)tetrathiofulvalene molecules embedded in the face surfaces thereof:

Latex used: styrene (48% in moles), butadiene (58%), maleic acid (2%) copolymer containing 10% of dry solids.

0.6 g of a chloroform solution containing 8 mg of TTF prepared in Example 1 was added, with stirring, at a pH of 4 and at room temperature, to 10 g of this latex. The mixture was then heated at 65° C. for 15 h with stirring.

The latex containing the amphiphilic compound was filtered on a nylon sheet with a mesh size equal to 5 μm.

In this manner, the latex of styrene/butadiene/maleic acid particles was obtained containing, implanted into the face surfaces thereof, approximately 0.8% by weight of C18-TTF with respect to the dry solids.

(b) Production of a conductive polymer:

A film of the modified latex prepared in (a) was poured onto a glass plate using a film-former adjusted to produce a thickness of 0.8 mm. The film and the support were placed in an oven for 24 h to evaporate the chloroform and water. When drying was complete, the film was separated from its support.

The film was contacted for 3 h, in a crystallizer, with iodine vapors in order to dope it by oxidation. It was then conditioned in a desiccator before measuring the surface resistance.

The surface resistance of the film was determined by means of an electrometer marketed under the trademark Keithley 617® and of a Keithley 6105® cell comprising 3 electrodes. The surface conductivity was easily calculated from the value of the surface resistance. The composite film obtained had a surface conductivity of $12 \times 10^{-8}$ cm$^{-1}$ after being maintained for 24 h in a desiccator.

By way of comparison, a film was prepared according to the procedure described above, but after having replaced the styrene/butadiene/maleic acid copolymer modified by the implantation of C18-TTF by the same unmodified styrene/butadiene/maleic acid copolymer. Under these conditions, a film was obtained which had a surface conductivity of $1.65 \times 10^{-13}$ S.cm$^{-1}$ after being maintained for 24 h in a desiccator.

EXAMPLES 3 TO 6

Repeating the procedure of Example 2, a series of electroconductive films was prepared from different styrene/butadiene/maleic acid copolymer latexes modified by the implantation of C18-TTF prepared in Example 1. The implantation of C18-TTF and the preparation of the electroconductive films were carried out under the same conditions as in Example 2, except for the following characteristics indicated below, with the surface conductivity values obtained.

EXAMPLE 3

(i) Copolymer containing 37% in moles of butadiene, 59% in moles of styrene and 4% in moles of maleic acid;

(ii) Implantation at 65° C. with a solution of C18-TTF in chloroform, at a pH of 4 and with stirring for 15 h;

(iii) Surface conductivity: $16.5 \times 10^{-8}$ S.cm$^{-1}$.

EXAMPLE 4

(i) Copolymer containing 37% in moles of butadiene, 59% in moles of styrene and 4% in moles of maleic acid;

(ii) Implantation at 95° C. with a solution of C18-TTF in toluene, at a pH of 4 and with stirring for 15 h;

(iii) Surface conductivity: $15 \times 10^{-8}$ S.cm$^{-1}$.

EXAMPLE 5

(i) Copolymer containing 48% in moles of butadiene, 50% in moles of styrene and 2% in moles of maleic acid;

(ii) Implantation at 95° C. with a solution of C18-TTF in toluene, at a pH of 4 and with stirring for 15 h;

(iii) Surface conductivity: $12 \times 10^{-8}$ S.cm$^{-1}$.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a polymeric composition, comprising adding a solution of at least one amphiphilic organic compound (B) in a solvent to a stable dispersion of at least one convertible polymer (Pm) in water or an aqueous/organic medium, and, optionally, removing the solvent;

wherein the amphiphilic organic compound (B) comprises a charge transfer complex or a radical ion salt having the formula (I):

 (I)

wherein,

D is an electron donor having the formula (VI):

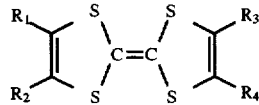 (VI)

wherein, $R_1$ and $R_2$ may be the same or different and each is hydrocarbon radicals, at least one of which is a hydrophobic radical, $R_3$ and $R_4$ may be the same or different, and each is a hydrophillic radical, A is an electron acceptor, Z is a Lewis acid doping agent selected from the group consisting of I, $(I_3)^-$, $(PF_6)^-$, $(ClO_4)^-$, $(BF_4)^-$, $(ReO_4)^-$, $(IO_4)^-$, $(FSO_3)^-$, $(AsF_4)^-$, $(AsF_6)^-$, Br, Cl$^-$ and $(MnCl_6)^-$, d is a number equal to or greater than 0, a is a number equal to or greater than 0, and z is a number equal to or greater than 0;

provided that, i) at least D or A is amphiphilic and contains at least one saturated or unsaturated hydrocarbon substituent having at least 10 carbon atoms, and ii) at least one of d and a is a number greater than 0.

2. The process as defined by claim 1, comprising heating the resulting admixture of polymer (Pm) dispersion and amphiphilic compound (B) to the glass transition temperature of said polymer (Pm).

3. The process as defined by claim 2, comprising doping the resulting admixture with a precursor of the doping agent Z.

* * * * *